(12) United States Patent
Hsieh et al.

(10) Patent No.: US 8,279,812 B2
(45) Date of Patent: Oct. 2, 2012

(54) METHOD AND MODULE FOR CONSTRUCTING A FRAME STRUCTURE IN COMMUNICATION SYSTEMS

(75) Inventors: Yu-Tao Hsieh, Hsinchu (TW); Pang-An Ting, Fongyuan (TW); Jen-Yuan Hsu, Jicheng Township (TW); Chih-Kai Wang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 410 days.

(21) Appl. No.: 12/168,846

(22) Filed: Jul. 7, 2008

(65) Prior Publication Data

US 2009/0016375 A1  Jan. 15, 2009

Related U.S. Application Data

(60) Provisional application No. 60/929,798, filed on Jul. 12, 2007.

(51) Int. Cl.
*H04W 4/00* (2009.01)
(52) U.S. Cl. .................. 370/329; 370/476; 370/478
(58) Field of Classification Search .................. 370/203, 370/320, 339, 349, 465–467, 474, 476, 478, 370/480–481, 329, 330, 336, 337; 375/150, 375/220, 240, 260, 342, 343, 350, 354, 368; 455/561, 450, 67.16, 452.1
See application file for complete search history.

(56) References Cited

U.S. PATENT DOCUMENTS

| | | | |
|---|---|---|---|
| 5,491,531 A | 2/1996 | Adams et al. | |
| 6,904,550 B2 | 6/2005 | Sibecas et al. | |
| 7,110,350 B2 | 9/2006 | Li et al. | |
| 7,586,887 B2 | 9/2009 | Trachewsky | |
| 7,809,020 B2 | 10/2010 | Douglas et al. | |
| 8,077,592 B2 * | 12/2011 | Webster et al. | 370/480 |
| 2002/0034172 A1 | 3/2002 | Ho | |
| 2004/0223478 A1 | 11/2004 | Fischer et al. | |
| 2005/0063345 A1 | 3/2005 | Wu et al. | |
| 2005/0111529 A1 | 5/2005 | Bradley | |
| 2005/0180461 A1 * | 8/2005 | Kao et al. | 370/480 |
| 2006/0018279 A1 | 1/2006 | Agrawal et al. | |
| 2006/0227778 A1 * | 10/2006 | Jin et al. | 370/465 |
| 2007/0097946 A1 | 5/2007 | Mujtaba | |
| 2007/0155315 A1 | 7/2007 | Lee et al. | |

(Continued)

FOREIGN PATENT DOCUMENTS

WO  WO 2006/092852 A1  9/2006

*Primary Examiner* — Jeffrey M Rutkowski
(74) *Attorney, Agent, or Firm* — Alston & Bird LLP

(57) ABSTRACT

A module constructs a frame for communication in a communication system that supports a new standard and a legacy standard, the new standard being backward compatible with the legacy standard. The module comprises a first frame generator configured to generate a first portion of the frame, the first portion of the frame to support a first set of data to be transmitted in the legacy standard in each of a number of first bands, a second frame generator configured to generate a second portion of the frame, the second portion of the frame to support a second set of data to be transmitted in the new standard in a second band composed of the first bands, and a frame constructor configured to construct the frame based on the first portion of the frame from the first frame generator and the second portion of the frame from the second frame generator.

34 Claims, 8 Drawing Sheets

U.S. PATENT DOCUMENTS

| | | |
|---|---|---|
| 2007/0189149 A1 | 8/2007 | Terabe |
| 2008/0095195 A1* | 4/2008 | Ahmadi et al. ............... 370/478 |
| 2008/0285513 A1* | 11/2008 | Jung et al. .................... 370/329 |
| 2009/0016371 A1* | 1/2009 | Zheng et al. .................. 370/465 |
| 2009/0116435 A1 | 5/2009 | Koorapaty et al. |
| 2011/0222504 A1* | 9/2011 | Ma et al. ....................... 370/329 |
| 2012/0140730 A1* | 6/2012 | Marks et al. .................. 370/330 |

* cited by examiner

METHOD AND MODULE FOR CONSTRUCTING A FRAME STRUCTURE IN COMMUNICATION SYSTEMS

CROSS-REFERENCE TO RELATED APPLICATIONS

This application claims the benefit of U.S. Provisional Application No. 60/929,798, filed Jul. 12, 2007. This application is hereby incorporated by reference in its entirety.

BACKGROUND

The present invention relates to communication systems. More particularly, the present invention relates to methods and modules for constructing a frame structure in a communication system.

Orthogonal Frequency Division Multiple Access (OFDMA) is a multiple access scheme for transmitting data in different subcarriers in a channel, wherein the data may come from different users and may be transmitted in disjoint subsets of sub-channels in a transmission bandwidth. The orthogonality property among the subcarriers may allow simultaneous transmission of data from different users without interference from one other. The multiple access scheme of the OFDMA may generally be applied in various communication systems, such as those defined in IEEE standard 802.16e ("legacy system" hereafter) and IEEE standard 802.16m ("new system" hereafter). The new system defined in the IEEE standard 802.16m may be required to provide enhanced spectrum efficiency, higher speed tolerance and full backward compatibility with the legacy system defined in the IEEE standard 802.16e.

Since a communication system, either legacy or new, may have an individual frame structure for data transmission, and the legacy and new systems may operate on the same radio frequency (RF) carrier in the same channel bandwidth, it may be desirable to have a new frame structure for the legacy and new systems to coexist in a communication network while enhancing spectrum efficiency and speed tolerance.

SUMMARY

Examples of the present invention may provide a module for constructing a frame for communication in a communication system that supports a new standard and a legacy standard, the new standard being backward compatible with the legacy standard, the module comprising a first frame generator configured to generate a first portion of the frame, the first portion of the frame to support a first set of data to be transmitted in the legacy standard in each of a number of first bands, a second frame generator configured to generate a second portion of the frame, the second portion of the frame to support a second set of data to be transmitted in the new standard in a second band composed of the first bands, and a frame constructor configured to construct the frame based on the first portion of the frame from the first frame generator and the second portion of the frame from the second frame generator.

Some examples of the present invention may also provide a module for constructing a frame for communication in a communication system that supports a new standard and a legacy standard, the new standard being backward compatible with the legacy standard, the module comprising a first frame generator configured to generate at least one first frame zone for each of a number of first bands for transmission of a first set of data in the legacy standard using the each of the first bands, at least one of the first bands being discontiguous with the other of the first bands, a second frame generator configured to generate at least one second frame zone for each of the first bands for transmission of a second set of data in the new standard using a second band composed of the first bands, and a frame constructor configured to construct the frame based on the at least one first frame zone for each of the first bands from the first frame generator and the at least one second frame zone for each of the first bands from the second frame generator.

Examples of the present invention may further provide a method for constructing a frame for communication in a communication system that supports a new standard and a legacy standard, the new standard being backward compatible with the legacy standard, the method comprising forming a first portion of the frame, the first portion of the frame to support a first set of data to be transmitted in the legacy standard in each of a number of first bands, forming a second portion of the frame, the second portion of the frame to support a second set of data to be transmitted in the new standard in a second band composed of the first bands, and constructing the frame based on the first portion of the frame from the first frame generator and the second portion of the frame from the second frame generator.

Examples of the present invention may also provide a method of communication in a communication system that supports a new standard and a legacy standard, the new standard being backward compatible with the legacy standard, the method comprising performing a first preamble cell search for a first preamble that supports communication in the new standard, decoding a first control field in a first frame related to the first preamble to identify the location of a first data zone if the first preamble is detected, performing a second preamble cell search for a second preamble that supports communication in the legacy standard if the first preamble is not detected, and decoding a second control field in a second frame related to the second preamble to identify the location of a second data zone.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION

Reference will now be made in detail to various embodiments of the invention, examples of which are illustrated in the accompanying drawings. Wherever possible, the same reference numbers will be used throughout the drawings to refer to the same or like parts.

Figure 1:
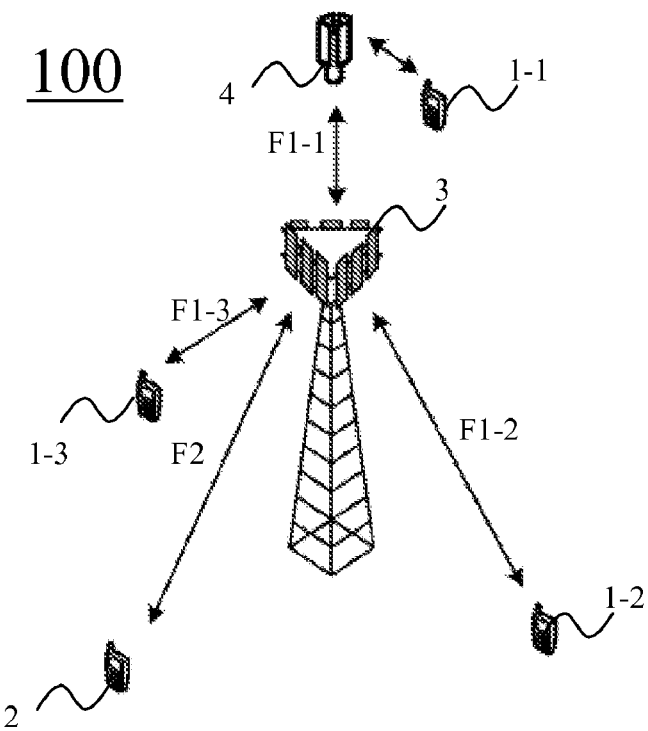
FIG. 1 is a schematic diagram illustrating a communication system according to an example of the present invention.

FIG. 1 is a schematic diagram illustrating a communication system 100 according to an example of the present invention. The communication system 100, for example, an orthogonal frequency division multiple access (OFDMA) system, may include a base station 3, a relay station 4, first mobile stations 1-1, 1-2 and 1-3 for communication in a legacy standard and a second mobile station 2 for communication in a new standard backward compatible with the legacy standard. The base station 3 may generate a frame comprising sub-frames F1-1, F1-2 and F1-3. Each of the sub-frames F1-1, F1-2 and F2-3 may be transmitted using, for example, one third of the channel bandwidth available for the communication system 100. The sub-frames F1-2 and F1-3 may be transmitted to the first mobile stations 1-2 and 1-3, respectively, while the sub-frame F1-1 may be transmitted from the base station 3 via the relay station 4 to the first mobile station 1-1. Moreover, a frame F2 may be generated by the base station 3 for the second mobile station 3. The frame F2 in one example may use the whole channel bandwidth of the communication system 100, and in another example may use a partial bandwidth.

The communication system 100 is able to support communications in both of a new standard and a legacy standard. With the rapid development in communication technologies, a new system or standard and a legacy system or standard may coexist in a communication network. In this case, the new standard may be backward compatible with the legacy standard. In one example according to the present invention, backward compatibility may include that a new terminal or subscriber station using a new standard may operate in a conventional network without significant impact on the performance and operation of terminals or stations relative to the conventional network. In other examples, backward compatibility may include that a legacy terminal or subscriber station using a conventional standard may operate in a new network without significant impact on the performance and operation of terminals or stations relative to the new network. Throughout the specification, a "new" system or standard may refer to an "updated," "evolved" or "next-generation" system or standard, while a "legacy" system or standard may refer to an "old" or "current" system or standard. For example, a "new" standard may be a standard that is in use as of the date of the filing of this application, and a "legacy" standard may be a standard that is in use prior to the date of the filing of this application and may be still in use for some time after the filing of this application.

Figure 2:
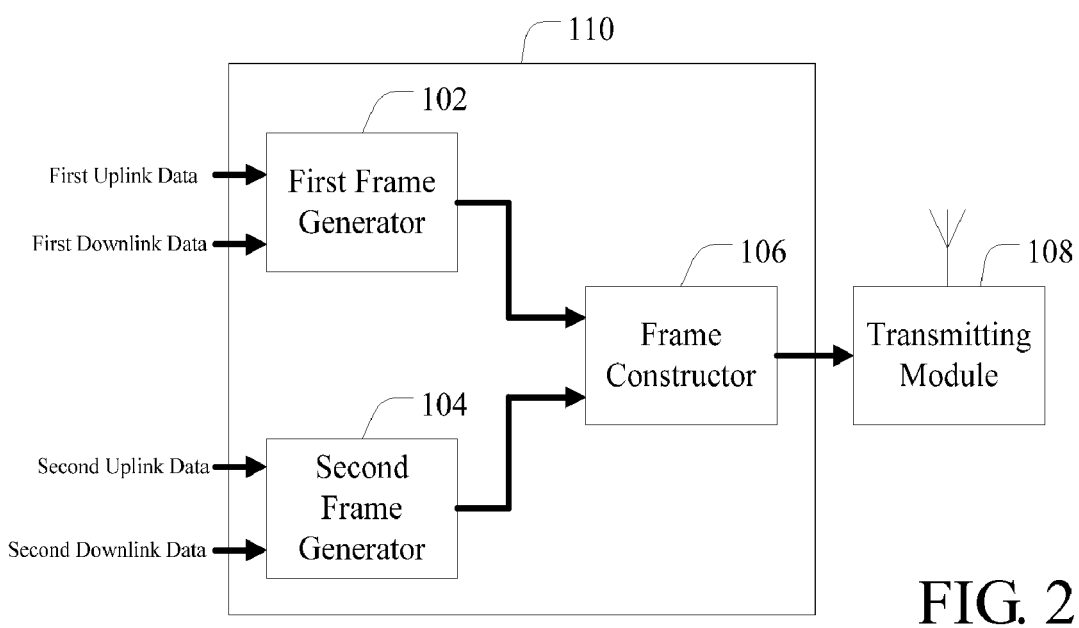
FIG. 2 is a block diagram illustrating a module for constructing a frame according to an example of the present invention.

FIG. 2 is block diagram illustrating a module 110 for constructing a frame according to an example of the present invention. Referring to FIG. 2, the module 110 may include a first frame generator 102, a second frame generator 104 and a frame constructor 106. The first frame generator 102 may be configured to generate a first portion of the frame for a first set of uplink and downlink data in order for communication in a first communication standard. The second frame generator 104 may be configured to generate a second portion of the frame for a second set of uplink and downlink data in order for communication in a second communication standard. In one example, the first communication standard may be a legacy standard such as the IEEE standard 802.16e, while the second communication standard may be a new standard such as the IEEE standard 802.16m. The frame constructor 106 may be configured to generate the frame, based on the first portion of the frame from the first frame generator 102 and the second portion of the frame from the second frame generator 104.

The module 110, including the first frame generator 102, the second frame generator 104 and the frame constructor 106, may be implemented in hardware or software. For example, if implemented in hardware, the module 110 may be integrated in a processor chip of an access station, for example, a base station such as the base station 3 or a relay station such as the relay station 4 illustrated in FIG. 1. Alternatively, if implemented in software, the module 110 may include executable programs or applications installed in a processor of the access station.

Furthermore, the module 110 may be electrically coupled with a transmitting module 108, which may be configured to transmit a frame from the frame constructor 106 to a receiving module (not shown). In one example, the transmitting module 108 may be capable of transmitting data in subcarriers in different radio frequency channels in, for example, an OFDMA system. Examples of frame structures will be discussed below.

Figure 3A:
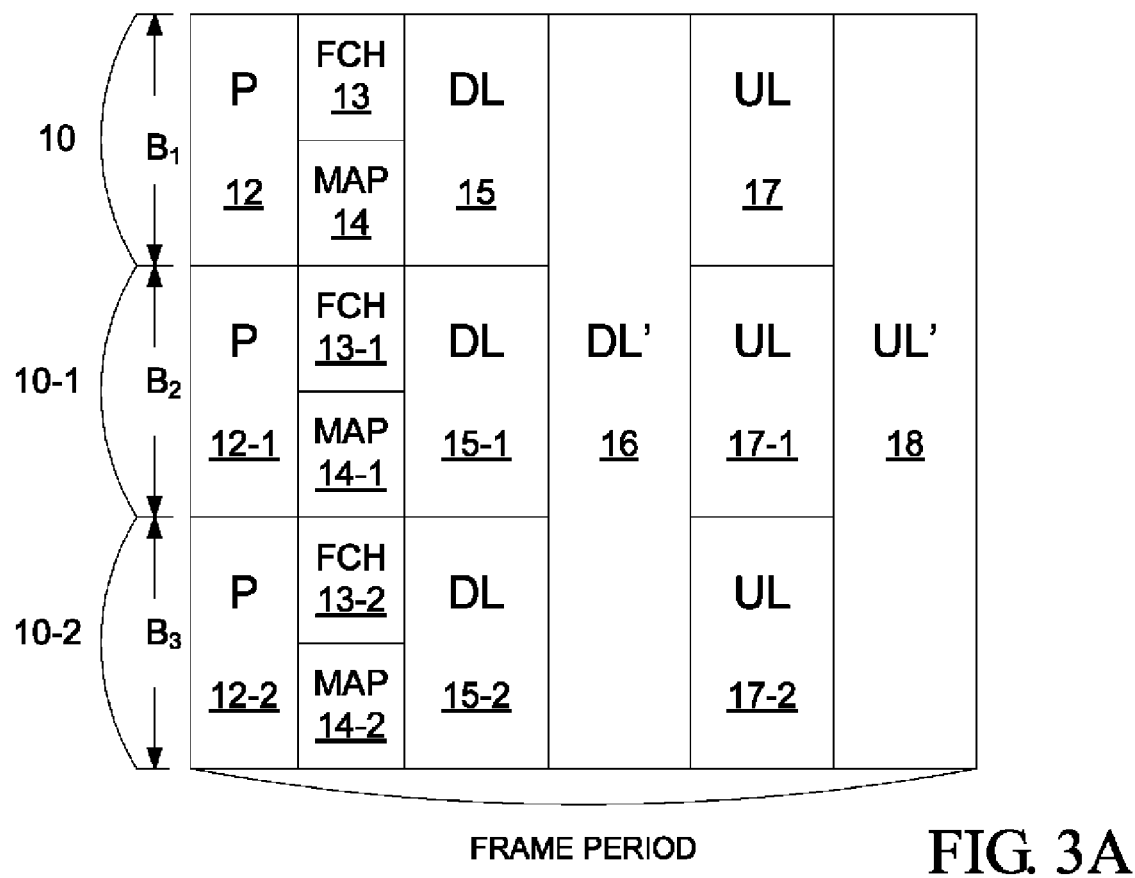
FIGS. 3A to 3E are diagrams of exemplary frame structures according to the present invention.

FIGS. 3A to 3E are diagrams of exemplary frame structures according to the present invention. Referring to FIG. 3A, the frame may be transmitted in a frame period in contiguous bands 10, 10-1 and 10-2 having bandwidths $B_1$, $B_2$ and $B_3$, respectively. Each of the bands 10, 10-1 and 10-2 in the present example may be available for communication in the legacy standard, while a whole band composed of the bands 10, 10-1 and 10-2 may be available for communication in the new standard. Furthermore, the number of bands in a frame may not be limited to three as in the present example. Skilled persons in the art will understand that two or four or more than four bands may also be possible to suit different applications.

The first portion of the frame may include a first preamble field, a first control field and first data fields. Similarly, the second portion of the frame may include a second preamble field, a second control field and second data fields. In the present example, in the first portion of the frame, the first portion of data for transmission in the legacy standard may include preambles 12, 12-1 and 12-2 in the first preamble field, frame control headers (FCH) 13, 13-1 and 13-2 and maps (MAP) 14, 14-1 and 14-2 in the first control field, and downlink data "DL" 15, 15-1 and 15-2, and uplink data "UL" 17, 17-1 and 17-2 in the first data fields. Furthermore, in the second portion of the frame, the second portion of data for transmission in the new standard may include downlink data "DL'" 16 and uplink data "UL'" 18 in the second data fields. Moreover, the preamble 12, FCH 13, MAP 14, DL 15 and UL 17 may be transmitted in the band 10 via a first channel, the preamble 12-1, FCH 13-1, MAP 14-1, DL 15-1 and UL 17-1 may be transmitted in the band 10-1 via a second channel, and the preamble 12-2, FCH 13-2, MAP 14-2, DL 15-2 and UL 17-2 may be transmitted in the band 10-2 via a third channel. Generally, the bandwidth for data transmission in the new standard may be greater than that for data transmission in the legacy standard. In the present example, the second portion of data DL' 16 and UL' 18 may be transmitted in the whole band having a bandwidth equal to $B_1+B_2+B_3$.

In the frame, the preambles 12, 12-1 and 12-2 may include information on synchronization and may be used to transmit a synchronization signal for synchronization acquisition in a transmission/reception duration. Furthermore, the FCHs 13, 13-1 and 13-2 may include information on sub-channels, ranging and a modulation or encoding method. Moreover, the MAPs 14, 14-1 and 14-2 may include information on the locations of the first and second portions of data. Taking the band 10 as an example, the preamble 12 may include first synchronization information for the DL 15 and UL 17, the FCH 13 may include information about demodulation or decoding of MAP 14, and the MAP 14 may include information on the locations of DL 15 and UL 17 in the frame. Similarly, for the band 10-1, the preamble 12-1 may include first synchronization information for the DL 15-1 and UL 17-1, the FCH 13-1 may include information about demodulation or decoding of MAP 14-1, and the MAP 14-1 may include information on the locations of DL 15-1 and UL 17-1 in the frame. Similarly, for the band 10-2, the preamble 12-1 may include first synchronization information for the DL 15-2 and UL 17-2, the FCH 13-2 may include information about demodulation or decoding of MAP 14-2, and the MAP 14-2 may include information on the locations of DL 15-2 and UL 17-2 in the frame.

Furthermore, at least one of the preamble 12, 12-1 or 12-2 may include second synchronization information for the second portion of data DL' 16 and UL' 18, and at least one of the MAP 14, 14-1 or 14-2 may include information on the locations of the DL' 16 and UL' 18 in the frame.

In the present example, the FCHs 13, 13-1 and 13-2 and the MAPs 14, 14-1 and 14-2 may be transmitted before the first and second portions of data. Moreover, the FCHs 13, 13-1 and 13-2 and the MAPs 14, 14-1 and 14-2 may be transmitted or received at the same time. Those skilled in the art can easily understand that a control field may include but is not limited to FCHs and MAPs, and other arrangements of the FCHs and MAPs may be possible to suit different applications.

Figure 3B:
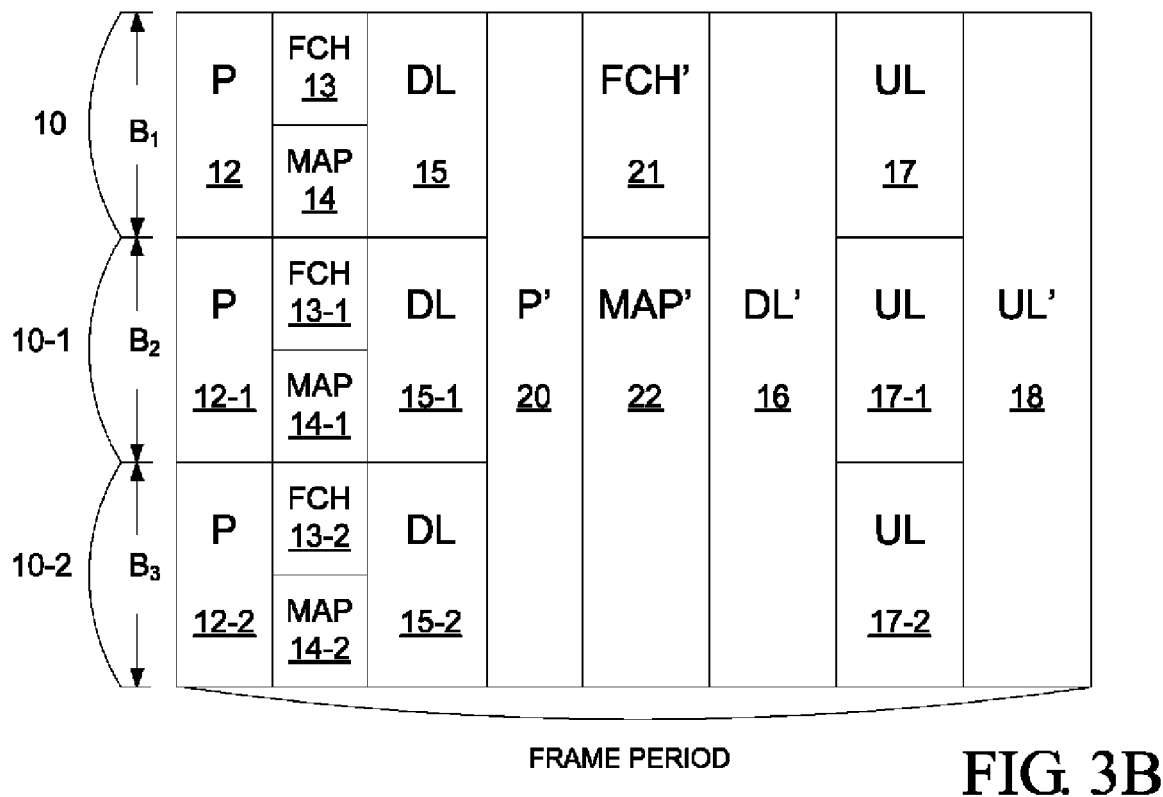

Referring to FIG. 3B, the frame structure may be similar to that described and illustrated with reference to FIG. 3C except that, for example, a second preamble field and a second control field may be provided. Specifically, a preamble 20 in the second preamble field, and FCH' 21 and MAP' 22 in the second control field may be added. Furthermore, the preamble 20 may include second synchronization information for the second portion of data DL' 16 and UL' 18, the FCH' 21 may include information about the demodulation or decoding of MAP' 22, and the MAP' 22 may include information on the locations of the DL' 16 and UL' 18 in the frame.

Figure 3C:
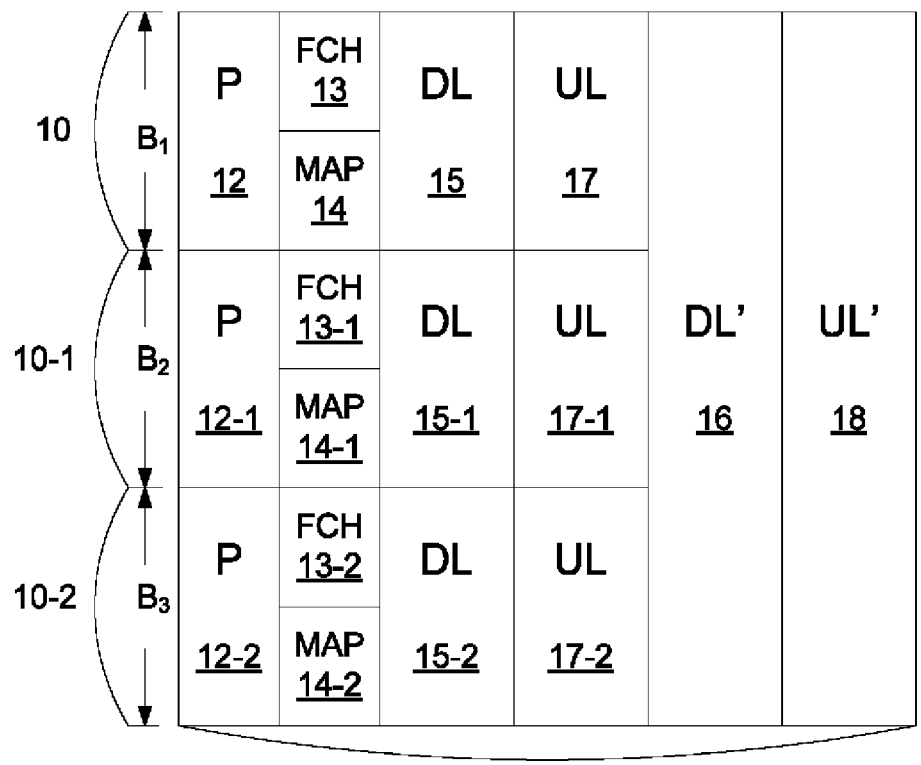

Referring to FIG. 3C, the frame structure may be similar to that described and illustrated with reference to FIG. 3A except that, for example, each of the first and second data fields forms an integral portion in the frame. Specifically, the uplink data UL 17, 17-1, 17-2 may be positioned in front of the DL' 16. Accordingly, the first portion of data may be transmitted before the second portion of data. Unlike the first or second portion of data illustrated in FIGS. 3A and 3B that is allocated in separate frame zones of the frame, in the present example, the first portion of data is arranged in one frame zone, while the second portion of data is arranged in another frame zone of the frame.

Figure 3D:
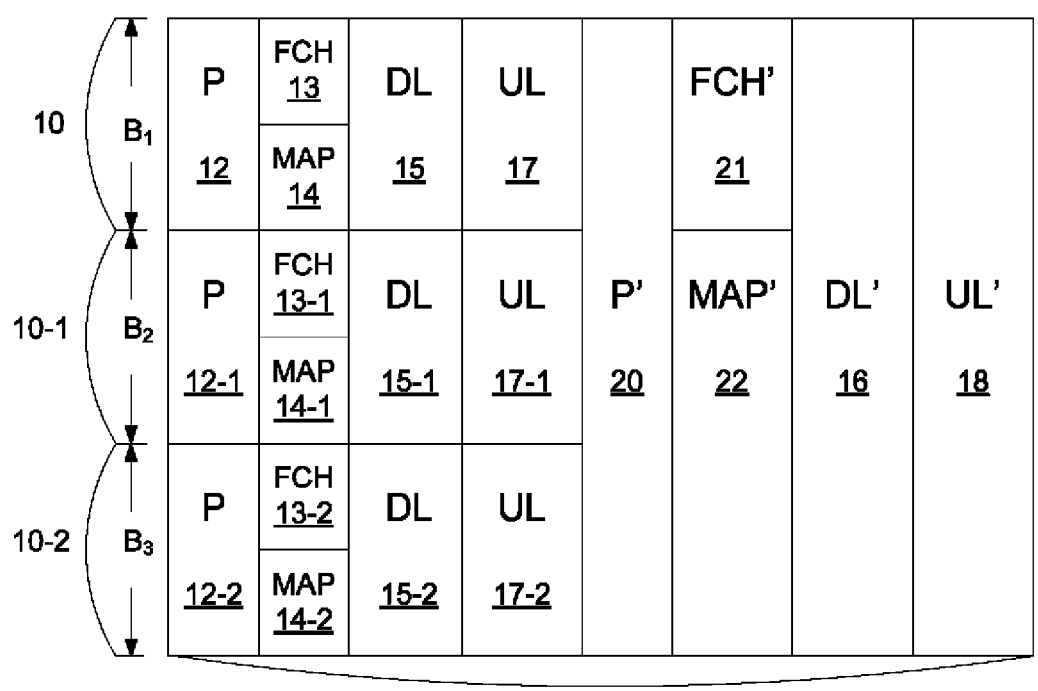

Referring to FIG. 3D, the frame structure may be similar to that described and illustrated with reference to FIG. 3B except that, for example, each of the first and second portions of the frame forms an integral portion in the frame. Specifically, the uplink data UL 17, 17-1, 17-2 may be positioned in front of the preamble 20. Accordingly, the first portion of data may be transmitted before the second portion of data. In the present example, the first portion of data is arranged in one frame zone, while the second portion of data is arranged in another frame zone of the frame.

Figure 3E:
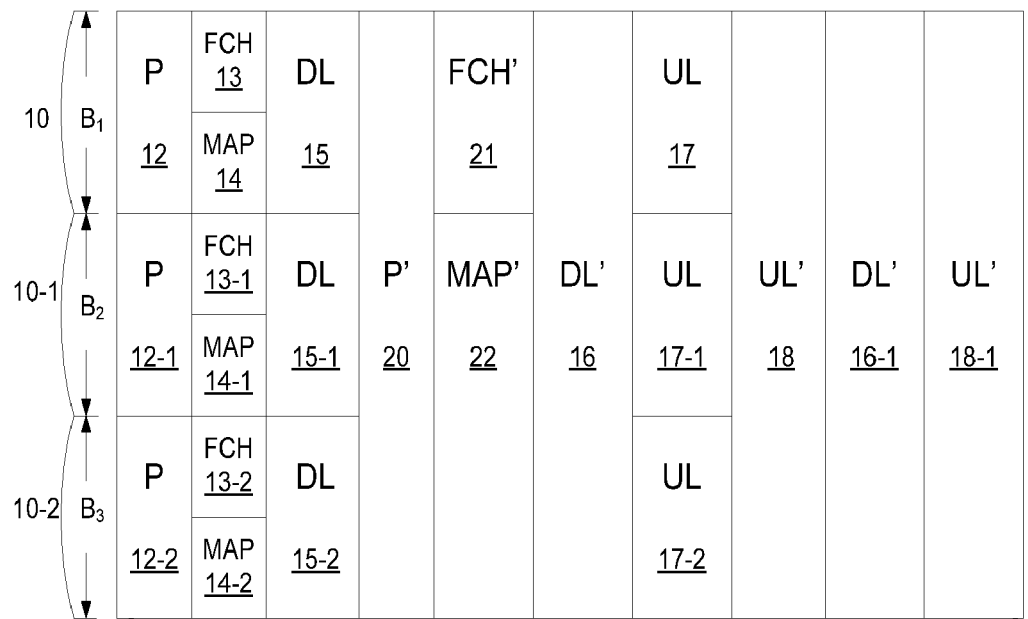

Referring to FIG. 3E, the frame structure may be similar to that described and illustrated with reference to FIG. 3B except that, for example, additional second data fields may be added for downlink data DL' 16-1 and uplink data UL' 18-1. Accordingly, the frame may be used to transmit multiple pairs of data, e.g., a first data pair DL' 16 and UL' 18 and a second data pair DL' 16-1 and UL' 18-1, in the new standard using the whole band.

Figure 4A:
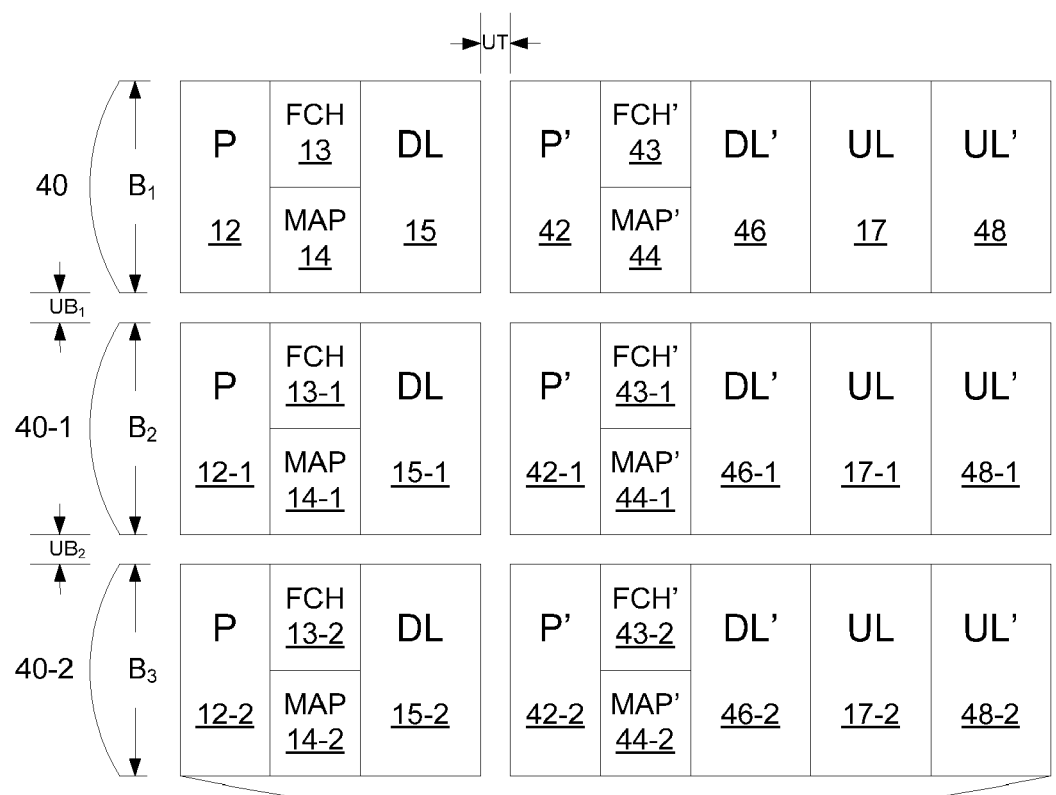
FIGS. 4A to 4C are diagrams of other exemplary frame structures according to the present invention.
Figure 4B:
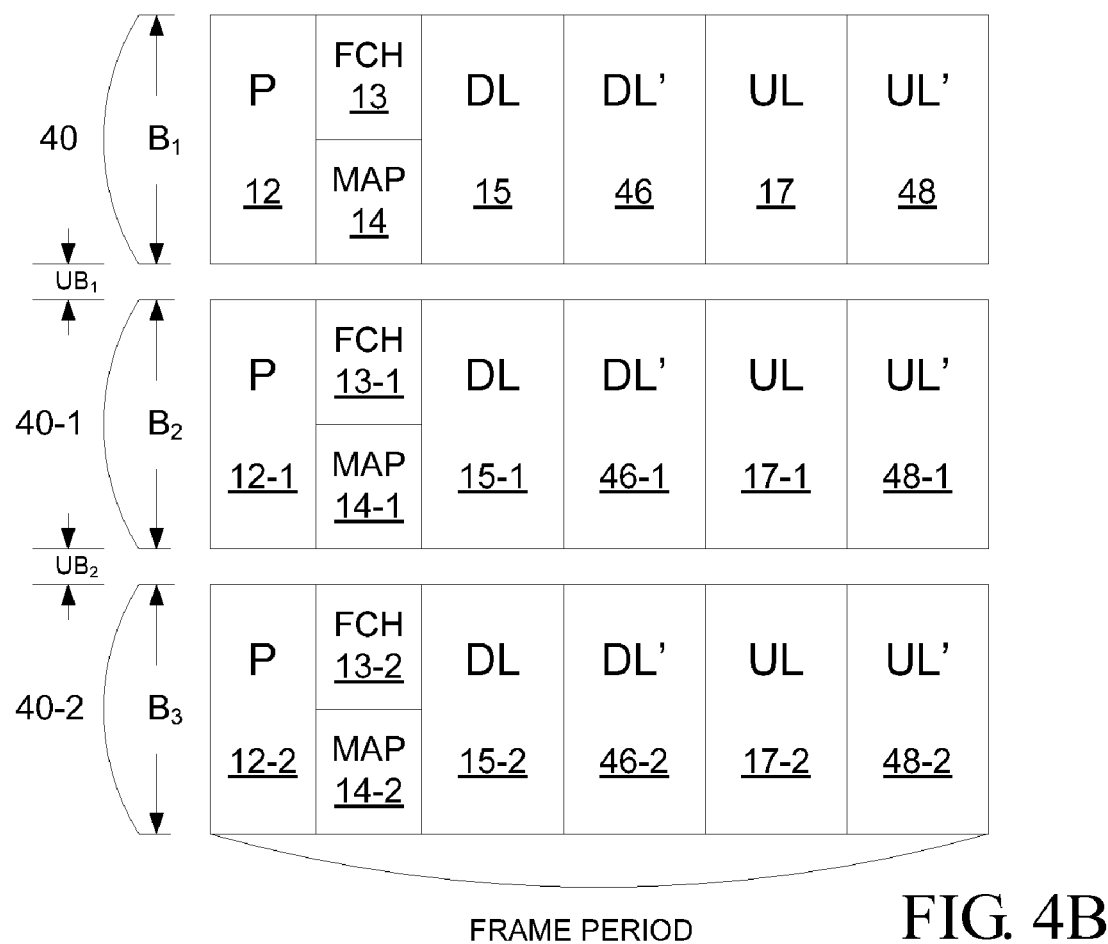
Figure 4C:
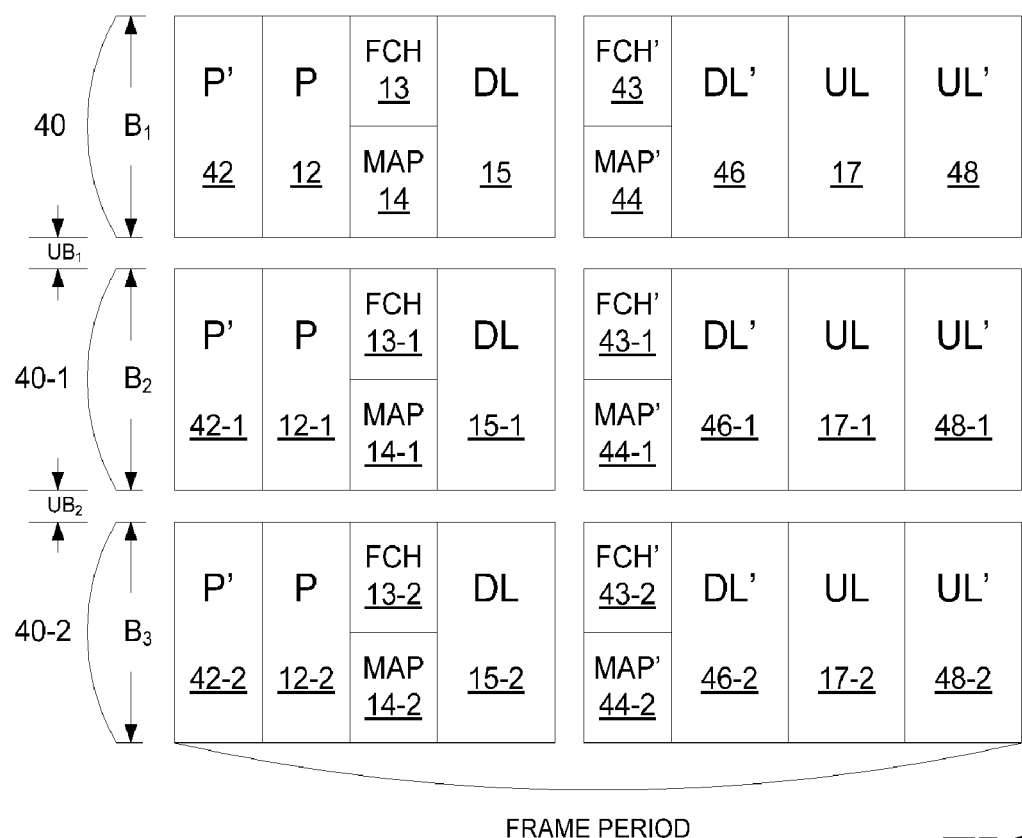

FIGS. 4A to 4C are diagrams of other exemplary frame structures according to the present invention. Referring to FIG. 4A, the frame structure may be similar to that described and illustrated with reference to FIG. 3B except, for example, bands 40, 40-1 and 40-2 are noncontiguous. Specifically, unlike the contiguous bands 10, 10-1 and 10-2 illustrated in FIG. 3B, the bands 40, 40-1 and 40-2 are discontiguous and may be separated by unused bands $UB_1$ and $UB_2$. Furthermore, a second preamble field including second preambles 42, 42-1 and 42-2 may be transmitted after a period of time "UT." Downlink data DL' 46, 46-1 and 46-2 and uplink data UL' 48, 48-1 and 48-2 may be transmitted to a single mobile station or a same user in the bands $B_1$, $B_2$ and $B_3$, respectively. In one example, one of the second preambles 42, 42-1 and 42-2 may include synchronization information for the transmission of DL' 46, 46-1, 46-2 and UL' 48, 48-1, 48-2. In this case, one of second control fields related to the one preamble may be decoded to identify the locations of DL' 46, 46-1, 46-2 and UL' 48, 48-1 and 48-2. In another example, the second preambles 42, 42-1 and 42-2 may include synchronization information for the transmission of their respective downlink data DL' and uplink data UL'. In this case, the second control fields FCHs 43, 43-1, 43-2 and MAPs 44, 44-1, 44-2 may be decoded to identify the locations of their respective DL' and UL'.

Referring to FIG. 4B, the frame structure may be similar to that described and illustrated with reference to FIG. 4A except that, for example, the second preamble field and the second control field may be eliminated. In one example, one of the first preambles 12, 12-1 and 12-2 may include synchronization information for the transmission of DL' 46, 46-1, 46-2 and UL' 48, 48-1, 48-2. In this case, one of the first control fields related to the one preamble may be decoded to identify the locations of DL' 46, 46-1, 46-2 and UL' 48, 48-1 and 48-2. In another example, the first preambles 12, 12-1 and 12-2 may include synchronization information for the transmission of their respective downlink data DL' and uplink data UL'. In this case, the first control fields FCHs 13, 13-1, 13-2 and MAPs 14, 14-1, 14-2 may be decoded to identify the locations of their respective DL' and UL'.

Referring to FIG. 4C, the frame structure may be similar to that described and illustrated with reference to FIG. 4A except that, for example, the second preamble field may be positioned in front of the first preamble field.

Figure 5A:
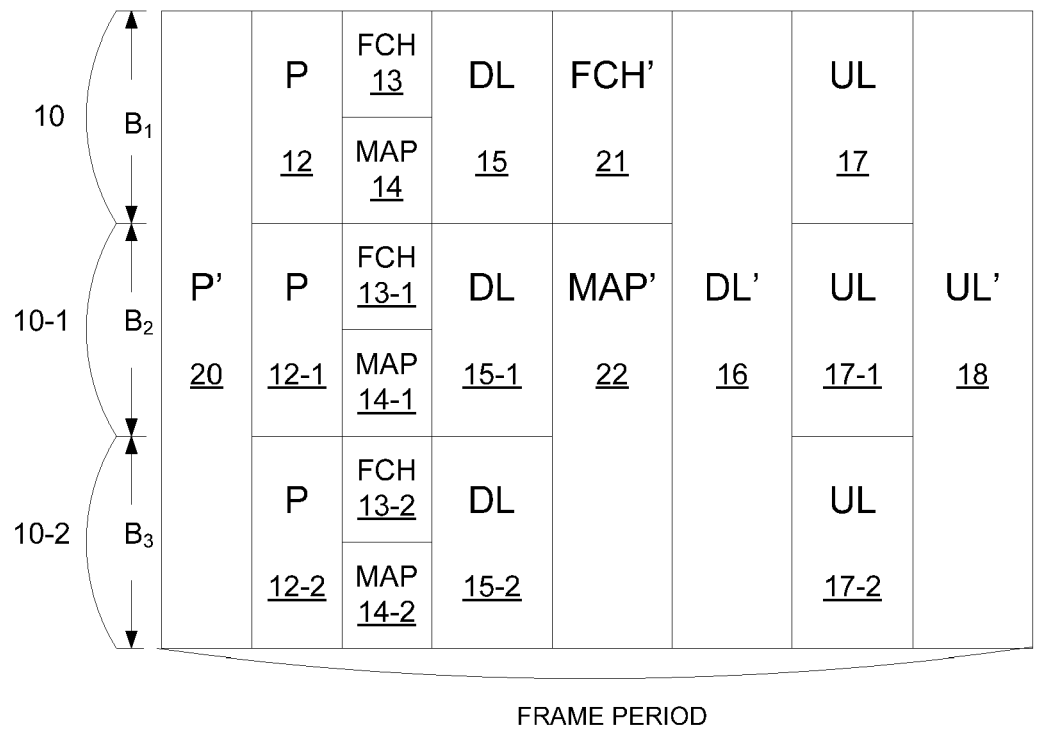
FIGS. 5A and 5B are diagrams of still other exemplary frame structures according to the present invention.
Figure 5B:
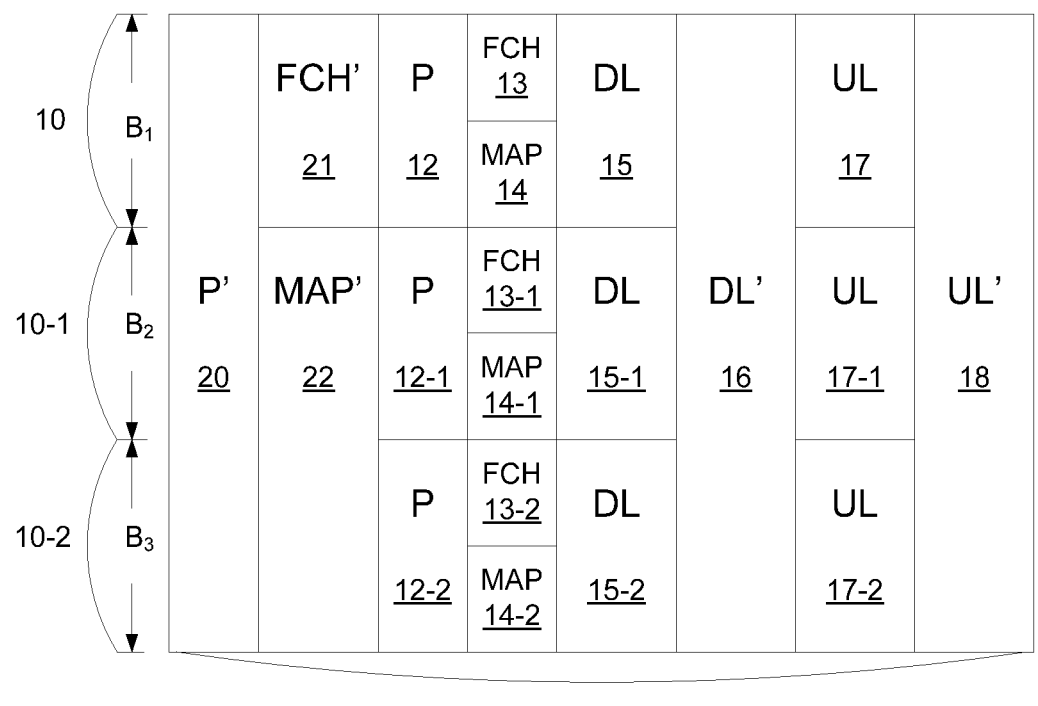

FIGS. 5A and 5B are diagrams of still other exemplary frame structures according to the present invention. Referring to FIG. 5A, the frame structure may be similar to that described and illustrated with reference to FIG. 3B except that, for example, the second preamble field may be positioned in front of the first preamble field. Generally, a frame may be provided with one first preamble field. The second preamble field, however, may not be provided in each frame.

In one example according to the present invention, approximately every two frames may be provided with one second preamble field.

Referring to FIG. 5B, the frame structure may be similar to that described and illustrated with reference to FIG. 5A except that, for example, the second preamble field and the second control field may be positioned in front of the first preamble field.

Figure 6:
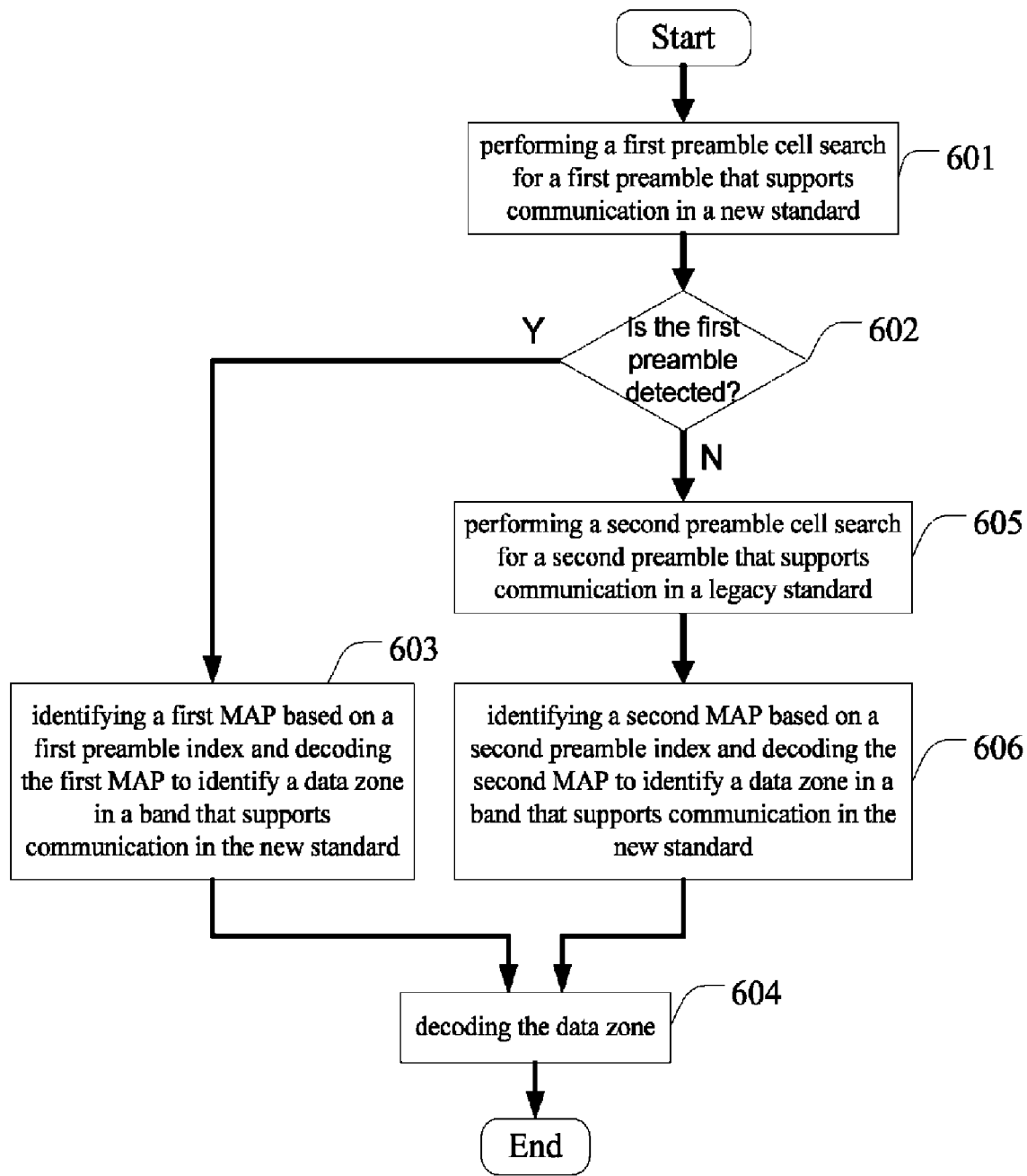
FIG. 6 is a flow diagram illustrating an exemplary method of receiving a frame according to the present invention.

FIG. 6 is a flow diagram illustrating an exemplary method of receiving a frame according to the present invention. The frame may have a frame structure similar to one described and illustrated in FIGS. 3 to 6. A first mobile station such as the first mobile station 1-1, 1-2 or 1-3 illustrated in FIG. 1 may perform a preamble cell search in the wireless communication system 100. A legacy preamble for communication in the legacy standard may be detected by the first mobile station. Next, a legacy FCH/MAP related to the legacy preamble may be decoded and then a data zone may be identified. As to a second mobile station such as the second mobile station 2 illustrated in FIG. 1, to identify a data zone, the method illustrated in FIG. 6 may be used. Referring to FIG. 6, at step 601, the second mobile station may perform a first preamble cell search for a first preamble that supports communication in the new standard.

In one example, the first preamble may be transmitted in a band having a bandwidth $$BW = \sum_{i=1}^{L} B_i,$$

where L is the number of bands in the wireless communication system, $B_i$ is the bandwidth of an i-th band of the L bands and the i-th band may individually serve communication in the legacy standard. In this case, the i-th band may be similar to one of the contiguous bands 10, 10-1 and 10-2 illustrated in, for example, FIG. 3B while the first preamble may be similar to the preamble 20 in FIG. 4B.

In another example, the first preamble may be transmitted in a j-th band having a bandwidth $B_j$ in the L bands and the j-th band may individually serve communication in both the legacy and new standards. In this case, the j-th band may be similar to one of the discontiguous bands 40, 40-1 and 40-2 illustrated in, for example, FIG. 4A while the first preamble may be similar to one of the preambles 40, 40-1 and 40-2 in FIG. 4B.

If at step 602 a such first preamble is detected, at step 603, a first MAP may be identified based on a preamble index in the first preamble and the first MAP may be decoded so as to identify a data zone in a frame to which the first preamble is related. The data zone may then be decoded at step 604.

If at step 602 no such first preamble is detected, then at step 605, a second preamble cell search for a second preamble that supports communication in the legacy standard may be performed. Subsequently, at step 606, a second MAP may be identified based on a second preamble index in the second preamble and the second MAP may be decoded so as to identify a data zone in a frame to which the second preamble is related. The data zone may then be decoded at step 604.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented a method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A station for constructing a frame for communication in a communication system that supports a new standard and a legacy standard, the new standard being backward compatible with the legacy standard, the station comprising:

a first frame generator configured to generate a first portion of the frame, the first portion of the frame to support a first set of data in the legacy standard in each of a number of first bands;

a second frame generator configured to generate a second portion of the frame, the second portion of the frame to support a second set of data in the new standard in a second band composed of two or more of the first bands, wherein:

the second portion of the frame comprising a new data field;

the second set of data comprising new downlink data and new uplink data in the new data field, the new downlink data and the new uplink data being allocated in a first integral zone of the frame; and the new downlink data and the new uplink data are transmitted asynchronously; and a frame constructor, integrated in a processor circuit, configured to construct the frame based on the first portion of the frame from the first frame generator and the second portion of the frame from the second frame generator.

2. The station of claim 1, wherein the first portion of the frame includes a first preamble field and a first control field and at least one legacy data field.

3. The station of claim 2, wherein the first set of data includes a first preamble in the first preamble field, a first frame control header (FCH) and a first map (MAP) in the first control field, and legacy downlink data and legacy uplink data in the at least one legacy data field.

4. The station of claim 2, wherein one of the at least one new data field is interleaved with the at least one legacy data field in the frame.

5. The station of claim 2, wherein the at least one legacy data field is arranged in a second integral zone of the frame.

6. The station of claim 2, wherein in each of the first bands the first control field includes information on the location of the at least one legacy data field in the frame.

7. The station of claim 2, wherein in one of the first bands the first control field includes information on the location of the at least one new data field in the frame.

8. The station of claim 2, wherein the second portion of the frame further includes a second preamble field and a second control field.

9. The station of claim 8, wherein the second control field includes information on the location of the new data field in the frame.

10. The station of claim 8, wherein the second preamble field is positioned in front of the first preamble field in the frame.

11. The station of claim 1, wherein at least one of the first bands is separated from others by an unused band.

12. A station for constructing a frame for communication in a communication system that supports a new standard and a legacy standard, the new standard being backward compatible with the legacy standard, the station comprising:
   a first frame generator configured to generate at least one first frame zone for each of a number of first bands for transmission of a first set of data in the legacy standard using the each of the first bands, at least one of the first bands being discontiguous with the other of the first bands;
   a second frame generator configured to generate at least one second frame zone for each of the first bands for transmission of a second set of data in the new standard using a second band composed of two or more of the first bands, wherein:
   the second frame zone of the frame comprising a new data field;
   the second set of data comprising new downlink data and new uplink data in the new data field, the new downlink data and the new uplink data being allocated in a first integral zone of the frame; and
   the new downlink and the new uplink data are transmitted asynchronously; and
   a frame constructor, integrated in a processor circuit, configured to construct the frame based on the at least one first frame zone for each of the first bands from the first frame generator and the at least one second frame zone for each of the first bands from the second frame generator.

13. The station of claim 12, wherein the at least one first frame zone includes a first preamble field, a first control field and at least one legacy data field.

14. The station of claim 13, wherein the first set of data includes a first preamble in the first preamble field, a first frame control header (FCH) and a first map (MAP) in the first control field, and legacy downlink data and legacy uplink data in the at least one legacy data field.

15. The station of claim 13, wherein one of the at least one new data field is interleaved with the at least one legacy data field in the frame.

16. The station of claim 13, wherein in each of the first bands the first control field includes information on the location of the at least one legacy data field in the frame.

17. The station of claim 13, wherein in one of the first bands the first control field includes information on the location of the at least one new data field in the frame.

18. The station of claim 13, wherein the at least one second frame zone further includes a second preamble field and a second control field.

19. The station of claim 18, wherein the second control field includes information on the location of the new data field in the frame.

20. The station of claim 18, wherein the second preamble field is positioned in front of the first preamble field in the frame.

21. A method for constructing a frame for communication in a station of a communication system that supports a new standard and a legacy standard, the new standard being backward compatible with the legacy standard, the method comprising:
   forming a first portion of the frame at the station, the first portion of the frame to support a first set of data in the legacy standard in each of a number of first bands;
   forming a second portion of the frame at the station, the second portion of the frame to support a second set of data in the new standard in a second band composed of two or more of the first bands, wherein:
   the second portion of the frame comprising a new data field;
   the second set of data comprising new downlink data and new uplink data in the new data field, the new downlink data and the new uplink data being allocated in a first integral zone of the frame; and
   the new downlink data and the new uplink data are transmitted asynchronously; and
   constructing, using a processor circuit at the station, the frame based on the first portion of the frame from a first frame generator and the second portion of the frame from a second frame generator.

22. The method of claim 21 further comprising providing the first portion of the frame with a first preamble field and a first control field and at least one legacy data field.

23. The method of claim 22 further comprising providing the first set of data with a first preamble in the first preamble field, a first frame control header (FCH) and a first map (MAP) in the first control field, and legacy downlink data and legacy uplink data in the at least one legacy data field.

24. The method of claim 22 further comprising interleaving one of the at least one new data field with the at least one legacy data field in the frame.

25. The method of claim 22 further comprising arranging the at least one legacy data field in a second integral zone of the frame.

26. The method of claim 22 further comprising decoding in each of the first bands the first control field to identify the location of the at least one legacy data field in the frame.

27. The method of claim 22 further comprising decoding in one of the first bands the first control field to identify the location of the at least one new data field in the frame.

28. The method of claim 22 further comprising providing the second portion of the frame with a second preamble field and a second control field.

29. The method of claim 28 further comprising decoding the second control field to identify the location of the at least one new data field in the frame.

30. The method of claim 28 further comprising positioning the second preamble field in front of the first preamble field in the frame.

31. The method of claim 21 further comprising separating at least one of the first bands from the other of the first bands by an unused band.

32. A method of communication in a communication system that supports a new standard and a legacy standard, the new standard being backward compatible with the legacy standard, the method comprising:
   performing a first preamble cell search for a first preamble, by a station, that supports communication in the new standard;
   decoding a first control field in a first frame related to the first preamble to identify the location of a first data zone in response to detecting the first preamble;
   performing a second preamble cell search for a second preamble, by the station that supports communication in the legacy standard, in response to attempting to detect and failing to detect the first preamble; and decoding, with a processor circuit, a second control field in a second frame related to the second preamble to identify the location of a second data zone.

33. The method of claim 32, wherein the first preamble is transmitted in a first band having a first bandwidth, and the second preamble is transmitted in at least one second band having a second bandwidth, the first bandwidth being equal to a sum of the second bandwidth of the at least one second band.

34. The method of claim 32, wherein the first preamble is transmitted in a first band having a first bandwidth, and the second preamble is transmitted in at least one second band, the first bandwidth being equal to the bandwidth of one of the at least one second band.

* * * * *

UNITED STATES PATENT AND TRADEMARK OFFICE
CERTIFICATE OF CORRECTION

PATENT NO. : 8,279,812 B2  Page 1 of 1
APPLICATION NO. : 12/168846
DATED : October 2, 2012
INVENTOR(S) : Hsieh et al.

It is certified that error appears in the above-identified patent and that said Letters Patent is hereby corrected as shown below:

On the Title page,
Item (75) Inventors: "Jicheng Township" should read --Jincheng Township--.

Signed and Sealed this
Ninth Day of April, 2013

Teresa Stanek Rea
*Acting Director of the United States Patent and Trademark Office*